United States Patent
McHugh et al.

(10) Patent No.: US 10,607,318 B2
(45) Date of Patent: Mar. 31, 2020

(54) SYSTEMS AND METHODS FOR IMAGE MATTING

(71) Applicant: Facebook, Inc., Menlo Park, CA (US)

(72) Inventors: Jason George McHugh, Seattle, WA (US); Michael F. Cohen, Seattle, WA (US); Johannes Peter Kopf, Seattle, WA (US); Piotr Dollar, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 182 days.

(21) Appl. No.: 15/849,379

(22) Filed: Dec. 20, 2017

(65) Prior Publication Data

US 2018/0189935 A1  Jul. 5, 2018

Related U.S. Application Data

(60) Provisional application No. 62/441,130, filed on Dec. 30, 2016.

(51) Int. Cl.
| | |
|---|---|
| *G06T 5/00* | (2006.01) |
| *G06T 5/20* | (2006.01) |
| *G06T 7/13* | (2017.01) |
| *G06T 7/143* | (2017.01) |
| *G06T 7/11* | (2017.01) |
| *G06T 7/194* | (2017.01) |
| *G06N 20/00* | (2019.01) |

(52) U.S. Cl.
CPC ............... *G06T 5/002* (2013.01); *G06T 5/20* (2013.01); *G06T 7/11* (2017.01); *G06T 7/13* (2017.01); *G06T 7/143* (2017.01); *G06T 7/194* (2017.01); *G06N 20/00* (2019.01); *G06T 2207/20081* (2013.01); *G06T 2207/20084* (2013.01); *G06T 2207/20192* (2013.01)

(58) Field of Classification Search
None
See application file for complete search history.

(56) References Cited

U.S. PATENT DOCUMENTS

| | | | | |
|---|---|---|---|---|
| 8,320,666 | B2* | 11/2012 | Gong | G06T 7/11 382/164 |
| 9,881,207 | B1* | 1/2018 | Nguyen | G06K 9/00369 |
| 2009/0290795 | A1* | 11/2009 | Criminisi | G06K 9/342 382/173 |
| 2011/0075926 | A1* | 3/2011 | Piramuthu | G06T 7/11 382/173 |

(Continued)

OTHER PUBLICATIONS

Hsieh, Chang-Lin, and Ming-Sui Lee. "Automatic trimap generation for digital image matting." 2013 Asia-Pacific Signal and Information Processing Association Annual Summit and Conference. IEEE, 2013. (Year: 2013).*

(Continued)

*Primary Examiner* — Andrae S Allison
(74) *Attorney, Agent, or Firm* — Sheppard Mullin Richter & Hampton LLP

(57) ABSTRACT

Systems, methods, and non-transitory computer-readable media can generate an initial alpha mask for an image based on machine learning techniques. A plurality of uncertain pixels is defined in the initial alpha mask. For each uncertain pixel in the plurality of uncertain pixels, a binary value is assigned based on a nearest certain neighbor determination.

20 Claims, 8 Drawing Sheets

(56) References Cited

U.S. PATENT DOCUMENTS

| | | | | |
|---|---|---|---|---|
| 2014/0003719 A1* | 1/2014 | Bai | ............... | G06T 7/269 |
| | | | | 382/173 |
| 2015/0213611 A1* | 7/2015 | Dai | ............... | G06T 7/194 |
| | | | | 382/199 |
| 2017/0236287 A1* | 8/2017 | Shen | ............... | G06K 9/6269 |
| | | | | 382/206 |

OTHER PUBLICATIONS

Xu, L., Ren, J., Yan, Q., Liao, R., & Jia, J. (Jun. 2015). Deep edge-aware filters. In International Conference on Machine Learning (pp. 1669-1678). (Year: 2015).*

Xu, Ning, et al. "Deep image matting." Proceedings of the IEEE Conference on Computer Vision and Pattern Recognition. 2017. (Year: 2017).*

Cho, Donghyeon, Yu-Wing Tai, and Inso Kweon. "Natural image matting using deep convolutional neural networks." European Conference on Computer Vision. Springer, Cham, 2016. (Year: 2016).*

Shen, X., Tao, X., Gao, H., Zhou, C. and Jia, J., Oct. 2016, Deep automatic portrait matting. In European Conference on Computer Vision (pp. 92-107). Springer, Cham. (Year: 2016).*

Shen, Xiaoyong et al., "Automatic Portrait Segmentation for Image Stylization," Computer Graphics Forum, vol. 35, No. 2, pp. 93-102, May 27, 2016.

* cited by examiner

550

Generate an initial alpha mask for an image based on machine learning techniques
552

Apply a threshold filter to the initial alpha mask to obtain an initial binary alpha mask
554

Define a plurality of uncertain pixels in the initial binary alpha mask
556

Define one or more edges in the image based on automated edge detection techniques
558

For each uncertain pixel, assign a binary value based on a nearest certain neighbor determination to obtain a final binary alpha mask, wherein the nearest certain neighbor determination comprises assessing a penalty for crossing an edge
560

Apply an edge-aware blur to the final binary alpha mask to obtain a final alpha mask
562

Replace a background portion of the image based on the final alpha mask and a second image
564

FIGURE 5B

SYSTEMS AND METHODS FOR IMAGE MATTING

CROSS-REFERENCE TO RELATED APPLICATIONS

This application claims priority to U.S. Provisional Patent Application No. 62/441,130, filed on Dec. 30, 2016 and entitled "SYSTEMS AND METHODS FOR IMAGE MATTING", which is incorporated in its entirety herein by reference.

FIELD OF THE INVENTION

The present technology relates to the field of content generation. More particularly, the present technology relates to systems and methods for image matting.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Users of a social networking system can be provided with tools to create content to share on the social networking system. User experience associated with the social networking system can be enhanced as the user is able to create and share interesting content. User experience associated with the social networking system can also be enhanced as the user is able to view interesting content created and shared by other users of the social networking system.

SUMMARY

Various embodiments of the present disclosure can include systems, methods, and non-transitory computer readable media configured to generate an initial alpha mask for an image based at least one machine learning technique. A plurality of uncertain pixels is defined in the initial alpha mask. For at least one uncertain pixel in the plurality of uncertain pixels, a binary value is assigned based on a nearest certain neighbor determination.

In an embodiment, one or more edges in the image are identified based on automated edge detection techniques.

In an embodiment, the nearest certain neighbor determination comprises assessing a penalty for crossing an edge of the one or more edges.

In an embodiment, the penalty is implemented using geodesic filtering.

In an embodiment, the assigning, for at least one uncertain pixel in the plurality of uncertain pixels, a binary value comprises assigning, for each uncertain pixel in the plurality of uncertain pixels, a binary value based on a nearest certain neighbor determination to obtain a final binary alpha mask. An edge-aware blur is applied to the final binary alpha mask.

In an embodiment, the edge-aware blur is applied to the final binary alpha mask based on guided filtering techniques.

In an embodiment, a threshold filter is applied to the initial alpha mask to obtain an initial binary alpha mask. The defining the plurality of uncertain pixels in the initial alpha mask comprises defining the plurality of uncertain pixels in the initial binary alpha mask.

In an embodiment, defining the plurality of uncertain pixels comprises defining a pre-defined number of uncertain pixels.

In an embodiment, the pre-defined number of uncertain pixels is determined based on a size of the image.

In an embodiment, a final alpha mask is generated based on the assigning, for each uncertain pixel in the plurality of uncertain pixels, a binary value. The image is modified based on the final alpha mask and a second image. The generating the initial alpha mask comprises calculating an alpha value for each pixel in the initial alpha mask, wherein the alpha value is indicative of a likelihood that the pixel is associated with a background portion or a foreground portion, and the alpha value is calculated based on the second image It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5B illustrates an example method associated with revising an image based on an alpha mask, according to an embodiment of the present disclosure.

Figure 1:
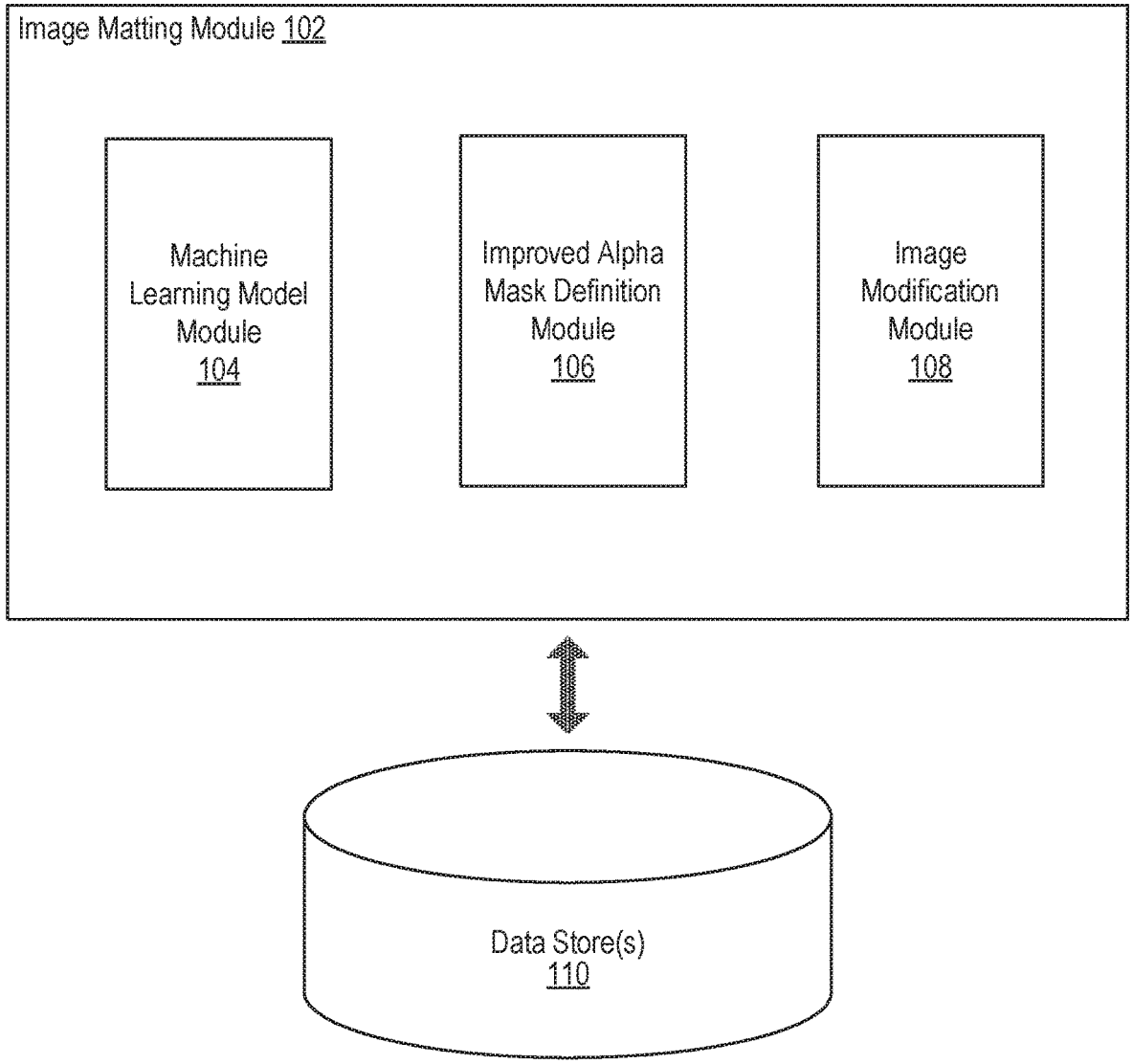
FIG. 1 illustrates an example system including an image matting module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Image Matting

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (i.e., a social networking service, a social network, etc.). For example, users can add friends or contacts, provide, post, or publish content items, such as text, notes, status updates, links, pictures, videos, and audio, via the social networking system.

Users of a social networking system can be provided with tools to create content to share on the social networking system. User experience associated with the social networking system can be enhanced as the user is able to create and share interesting content. User experience associated with the social networking system can also be enhanced as the user is able to view interesting content created and shared by other users of the social networking system.

It continues to be an important interest for a social networking system to provide users with tools to easily create and share interesting, high quality content to the social networking system. Such tools can lead to greater numbers of interesting content posts on the social networking system. Greater numbers of interesting content posts lead to greater engagement and interaction on the social networking system. However, it can be difficult to provide users with such tools. For example, in certain conventional approaches, tools provided with the intent of assisting users in creating interesting content may be unintuitive and difficult to use. In certain conventional approaches, tools and features provided to users with the intent of assisting users in creating interest content may simply be ineffective at creating interesting content.

An improved approach rooted in computer technology overcomes the foregoing and other disadvantages associated with conventional approaches specifically arising in the realm of computer technology. Based on computer technology, the disclosed technology can generate an improved alpha mask that can be used to automatically modify images. The alpha mask (also known as an alpha channel) can be used to distinguish between a foreground portion and a background portion of an image. A user can utilize the alpha mask to, for example, automatically replace the background portion of an image with another image. For example, an image may depict a person standing in front of a forest. The alpha mask can define the person as the "foreground," and any other elements of the image as the "background." The alpha mask can be utilized to replace the background (e.g., the forest) with another image, for example, a beach, or a flag, such that the person is now depicted as standing in front of a beach or a flag. Although the terms "foreground" and "background" will be utilized to describe the alpha mask, it should be understood that these terms do not necessarily involve physical position or orientation. Rather, the "foreground" or a foreground portion can be understood to include one or more objects of interest that are depicted in an image, and the "background" or a background portion can be understood to include all other objects and/or portions of an image. In certain embodiments, an initial alpha mask can be generated for an image based on machine learning techniques. The initial alpha mask can then be modified to yield an improved, or final, alpha mask. These concepts will be described in greater detail herein.

FIG. 1 illustrates an example system 100 including an example image matting module 102 configured to generate an alpha mask for an image, and to modify the image based on the alpha mask, according to an embodiment of the present disclosure. In certain embodiments, an initial alpha mask can be generated for an image based on machine learning techniques. The initial alpha mask can then be modified to yield an improved, or final, alpha mask. In certain embodiments, a plurality of pixels in the initial alpha mask can be identified or defined as uncertain pixels. Each pixel in the plurality of uncertain pixels can then be defined based on a nearest neighbors determination to obtain a final binary alpha mask. In certain embodiments, the nearest neighbors determination can include identifying one or more edges in the image based on automated edge detection techniques, and assessing a penalty for crossing an edge. In certain embodiments, an edge-aware blur can be applied to the final binary alpha mask.

As shown in the example of FIG. 1, the image matting module 102 can include a machine learning model module 104, an improved alpha mask definition module 106, and an image modification module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The image matting module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the image matting module 102 can be implemented, in part or in whole, as software running on one or more computing devices or systems, such as on a server computing system or a user (or client) computing system. For example, the image matting module 102, or at least a portion thereof, can be implemented as or within an application (e.g., app), a program, or an applet, etc., running on a user computing device or a client computing system, such as the user device 610 of FIG. 6. In another example, the image matting module 102 or at least a portion thereof can be implemented using one or more computing devices or systems that include one or more servers, such as network servers or cloud servers. In some instances, the image matting module 102 can, in part or in whole, be implemented within or configured to operate in conjunction with a social networking system (or service), such as the social networking system 630 of FIG. 6. It should be understood that there can be many variations or other possibilities.

The image matting module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the image matting module 102. For example, the data store 110 can store images, machine learning models, alpha masks, and the like. It is contemplated that there can be many variations or other possibilities.

The machine learning model module 104 can be configured to train and utilize a machine learning model to generate an initial alpha mask of an image. The machine learning model can be trained to receive an image, and to assign each pixel of the image with an alpha value indicative of the likelihood that the pixel represents a foreground portion or a background portion. For example, the alpha value can be a value between 0 and 1, with a 0 indicating a very high likelihood that the pixel represents a background portion, and a 1 indicating a very high likelihood that the pixel represents a foreground portion. Once trained, the machine learning model can be utilized to generate an initial alpha mask of an image. The machine learning model module 104 will be described in greater detail herein with reference to FIG. 2.

The improved alpha mask definition module 106 can be configured to generate an improved, or final alpha mask based on an initial alpha mask. In certain embodiments, an initial alpha mask can be received, and a plurality of pixels in the initial alpha mask can be defined as uncertain pixels. In certain embodiments, each pixel in the alpha mask that is not defined as an uncertain pixel can be assigned a binary value indicative of a foreground portion or a background portion. Each pixel in the plurality of uncertain pixels can be defined and assigned a binary value based on a nearest certain neighbor determination. The nearest certain neighbor determination can comprise identifying, for each pixel in the plurality of uncertain pixels, a nearest neighbor that is identified as "certain" (i.e., is not an uncertain pixel), and assigning the uncertain pixel the same value as the nearest certain pixel. In certain embodiments, edge detection techniques can be utilized to define one or more edges in the image. The nearest certain neighbor determination can comprise a penalty for crossing any of the one or more edges. For example, if a first certain pixel and a second certain pixel are equidistant from an uncertain pixel, but the first certain pixel is separated from the uncertain pixel by an edge and the second certain pixel is not, the distance between the first certain pixel and the uncertain pixel is assessed a penalty, and the second certain pixel is determined to be the nearest certain pixel. By assigning a binary value to each pixel of the plurality of uncertain pixels, a final binary alpha mask can be obtained. In certain embodiments, an edge-aware blur can be applied to the final binary alpha mask to obtain a final alpha mask. The edge-aware blur can comprise applying non-binary values (e.g., values greater than 0 but less than 1) to a plurality of pixels in the final binary alpha mask to create smoother edge transitions. The improved alpha mask definition module 106 is described in greater detail herein with reference to FIG. 3.

The image modification module 108 can be configured to modify an image based on an alpha mask. For example, the alpha mask may be a final alpha mask (e.g., a final binary alpha mask and/or a final non-binary alpha mask) generated by the improved alpha mask definition module 106. In certain embodiments, a first image may be modified based on an alpha mask and a second image. For example, each pixel in the alpha mask can be associated with a pixel in the first image, and can be assigned an alpha value, as discussed above. The alpha value of a pixel can be utilized to define an opacity of the pixel. For example, if the alpha value of a pixel in the alpha mask is 0, the associated pixel in the first image can be modified to be completely transparent. Conversely, if the alpha value of a pixel in the alpha mask is 1, the associated pixel in the first image can be completely opaque. Values between 0 and 1 may define semi-transparency. Each pixel in the first image can also be associated with a pixel in the second image. As such, if a pixel in the first image is made completely transparent, the pixel is replaced with a corresponding pixel in the second image. If a pixel in the first image is made semi-transparent, the pixel takes on a color that is a combination of the pixel in the first image and the associated pixel in the second image. In this way, an alpha mask can be used to replace background portions of a first image with a second image. For example, consider an example scenario including a first image of a person standing in front of a forest, and a second image of a French flag. An alpha mask for the first image can define the person in the first image as foreground, and the forest in the first image as background. By utilizing the alpha mask to define transparency values, the forest of the first image can be replaced with the French flag of the second image, such that the first image is modified to make it appear as if the person is standing in front of a French flag.

Figure 2:
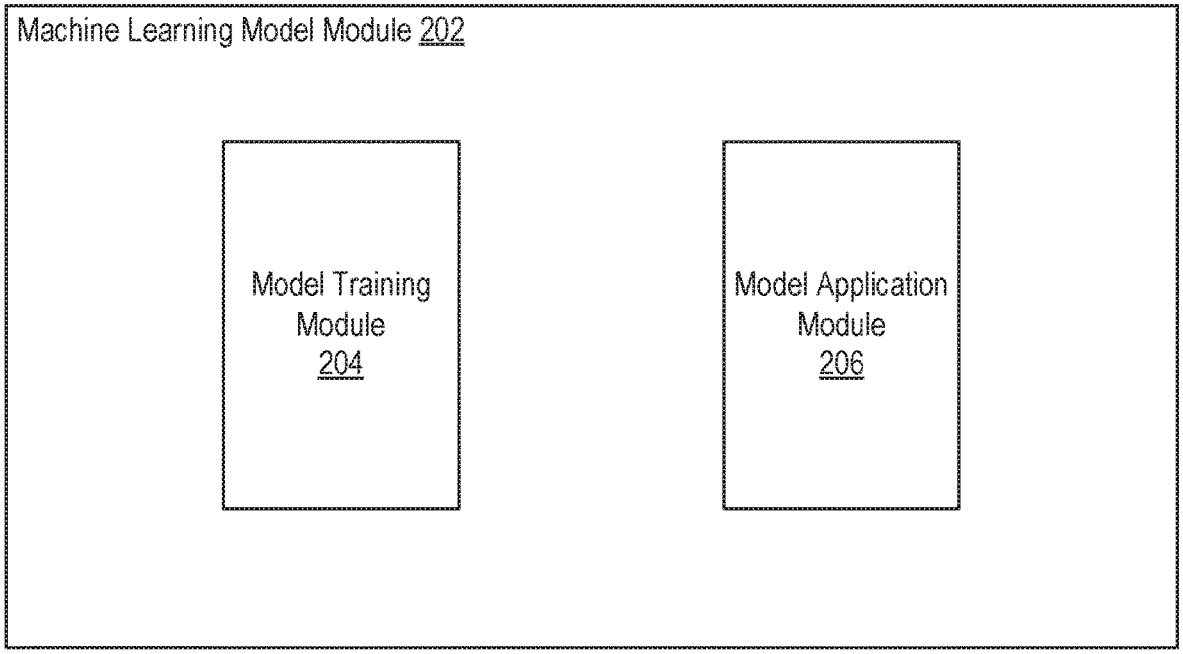
FIG. 2 illustrates an example machine learning model module, according to an embodiment of the present disclosure.

FIG. 2 illustrates an example machine learning model module 202 configured to train and apply a machine learning model to generate an initial alpha mask for an image, according to an embodiment of the present disclosure. In some embodiments, the machine learning model module 104 of FIG. 1 can be implemented as the example machine learning model module 202. As shown in FIG. 2, the machine learning model module 202 can include a model training module 204 and a model application module 206.

The model training module 204 can be configured to train a machine learning model to generate alpha masks for images based on training data. In certain embodiments, a machine learning model can be trained based on training data to assign each pixel in an image with an alpha value indicative of a likelihood that the pixel represents a foreground portion or a background portion. In certain embodiments, the machine learning model can be a convolutional neural network. In certain embodiments, the training data can comprise a plurality of images which have been manually tagged with foreground portions and background portions. For example, a reviewer can review each image in the training data and mark which portions of the image represent a foreground portion.

In certain embodiments, the machine learning model can be trained such that foreground objects or foreground portions in a first image are identified based on a second image. In other words, the second image may be used as context for differentiating between foreground and background objects or portions in the first image. For example, consider an example in which a first image depicts a person standing in front of the Eiffel Tower. In a first scenario, a second image depicts the French flag, and in a second scenario, the second image depicts a beach. The machine learning model can be trained to identify that, in the first scenario, the Eiffel Tower is an object that is related to the second image, i.e., the French flag. As such, the Eiffel Tower may be identified as a foreground object in addition to the person. By creating an alpha mask that identifies the Eiffel Tower and the person as foreground objects, or foreground portions, the first image can be modified so that background portions of the first image are replaced with the second image (i.e., the French Flag). Modification of the first image in the first scenario would result in a person and the Eiffel Tower (i.e., the foreground portions) presented against a background of the French flag (i.e., the second image). However, in the second scenario, the second image is changed to an image of a beach. In this second scenario, it may be determined that the Eiffel Tower is not affiliated with the second image. As such, in this scenario, the machine learning model can identify the Eiffel Tower as a background object, or a background portion. In the second scenario, when the first image is modified using an alpha mask and the second image, background portions of the first image, which now include the Eiffel Tower, are replaced with the second image, i.e., the image of the beach. As such, in the second scenario, modification of the first image would result in an image of the person (the only foreground portion of the first image) standing on a beach (the second image).

The model application module 206 can be configured to receive an image and to return an alpha mask for the image based on a machine learning model. In certain embodiments, the model application module 206 can be provided with an image for processing. The image can be provided to the machine learning model trained by the model training module 204 to generate an alpha mask for the image. The alpha mask can have dimensions that are identical to the dimensions of the image. For example, if the image is 2048×2048 pixels, the alpha mask can also be 2048×2048 pixels. Each pixel in the alpha mask can correspond to a pixel in the image. Each pixel in the alpha mask can be assigned an alpha value indicative of the likelihood that the corresponding pixel in the image represents a foreground portion or a background portion. For example, the alpha value can be a value between 0 and 1, in which a 0 indicates a very high likelihood that the pixel is background, and a 1 indicates a very high likelihood that the pixel is foreground.

Figure 3:
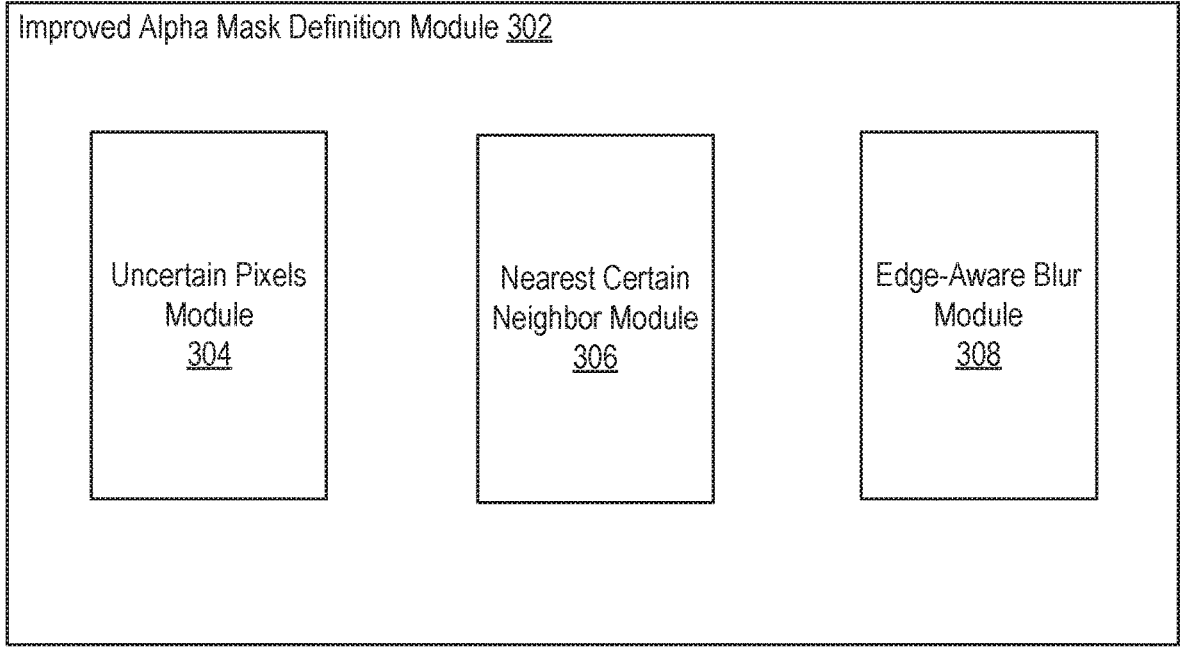
FIG. 3 illustrates an example improved alpha mask definition module, according to an embodiment of the present disclosure.

FIG. 3 illustrates an example improved alpha mask definition module 302 configured to generate a final alpha mask based on an initial alpha mask, according to an embodiment of the present disclosure. In some embodiments, the improved alpha mask definition module 106 of FIG. 1 can be implemented as the improved alpha mask definition module 302. As shown in FIG. 3, the improved alpha mask definition module 302 can include an uncertain pixels module 304, a nearest certain neighbor module 306, and an edge-aware blur module 308.

The uncertain pixels module 304 can be configured to define a plurality of pixels in an initial alpha mask as uncertain pixels. In certain embodiments, the uncertain pixels module 304 can receive an initial alpha mask (e.g., an alpha mask that has been generated based on a machine learning model). The initial alpha mask may comprise, for each pixel, a non-binary alpha value (e.g., a value between 0 and 1). In certain embodiments, a threshold filter can be applied to the initial alpha mask to generate an initial binary alpha mask. For example, each pixel having an alpha value greater than or equal to 0.5 can be assigned the binary value 1, and each pixel having an alpha value below 0.5 can be assigned the binary value 0. The initial binary alpha mask can include one or more boundaries, in which adjacent pixels transition from background to foreground (e.g., 0 to 1) or vice versa. The uncertain pixels module 304 can be configured to define a pre-determined number of uncertain pixels at these boundaries. For example, at each boundary in which pixels transition from background to foreground, 30 pixels can be defined as uncertain pixels (e.g., 15 pixels on one side of the boundary, and 15 pixels on the other side of the boundary). In certain embodiments, the pre-determined number of uncertain pixels may be determined based on dimensions of the image. For example, the number of uncertain pixels defined at each boundary may equal 6% of the number of pixels in an image, with a minimum of 30 pixels. In this way, larger images may have a greater number of uncertain pixels defined.

In certain embodiments, uncertain pixels can be defined directly on the initial alpha mask based on the initial alpha mask's non-binary alpha values. For example, two different thresholds can be implemented, such that pixels having an alpha value below a lower threshold can be defined as background, pixels having an alpha value above an upper threshold can be defined as foreground, and pixels between the two thresholds can be defined as uncertain pixels. Whether uncertain pixels are defined on an initial alpha mask with non-binary alpha values, or are defined on an initial binary alpha mask, the end result is a three-state alpha mask in which pixels are identified as either background, foreground, or uncertain.

The nearest certain neighbor module 306 can be configured to assign a binary value to each pixel in the plurality of uncertain pixels based on a nearest certain neighbor determination. As discussed above, the uncertain pixels module 304 can assign each pixel in an alpha mask one of three values: background, foreground, or uncertain. Each pixel assigned as either background or foreground can be considered a "certain pixel." The nearest certain neighbor module 306 can be configured to identify, for each pixel in the plurality of uncertain pixels, a nearest certain pixel (i.e., a nearest certain neighbor) based on a distance calculation.

In certain embodiments, automated edge detection techniques, such as the Canny edge detection technique, can be used to identify one or more edges in the image. These edges can be utilized in the nearest certain neighbor determination. For example, the nearest certain neighbor determination can comprise assessing a penalty for crossing an edge. For example, if a first certain pixel and a second certain pixel are equidistant from an uncertain pixel, but the first certain pixel is separated from the uncertain pixel by an edge and the second certain pixel is not, the distance from the uncertain pixel to the first certain pixel is assessed a penalty due to the edge. As such, the second certain pixel is identified as the nearest certain neighbor. In certain embodiments, penalties for crossing edges can be implemented using geodesic filtering. For example, each edge in an image can be assigned a depth, such that the distance from one pixel to another must account for the depth of any edges crossed. Each pixel of the plurality of uncertain pixels can be assigned a binary value (e.g., background or foreground), to obtain a final binary alpha mask.

The edge-aware blur module 308 can be configured to apply an edge-aware blur to the final binary alpha mask to obtain a final non-binary alpha mask. As discussed above, each pixel of the final binary alpha mask may have a binary value. However, modifying an image using a binary alpha mask may result in visually unappealing results. For example, certain pixels near borders of objects may be incorrectly assigned to the background or the foreground, resulting in jagged, inconsistent, and/or disjointed edges around objects. In order to generate a more visually appealing result, an edge-aware blur can be applied to the final binary alpha mask to create a more gradual edge around objects. The edge-aware blur can be applied using, for example, guided filtering and/or a bilateral filter. The edge-aware blur can be implemented by assigning non-binary values where transitions are detected between background objects and foreground objects based on the final binary alpha mask.

Figure 4:
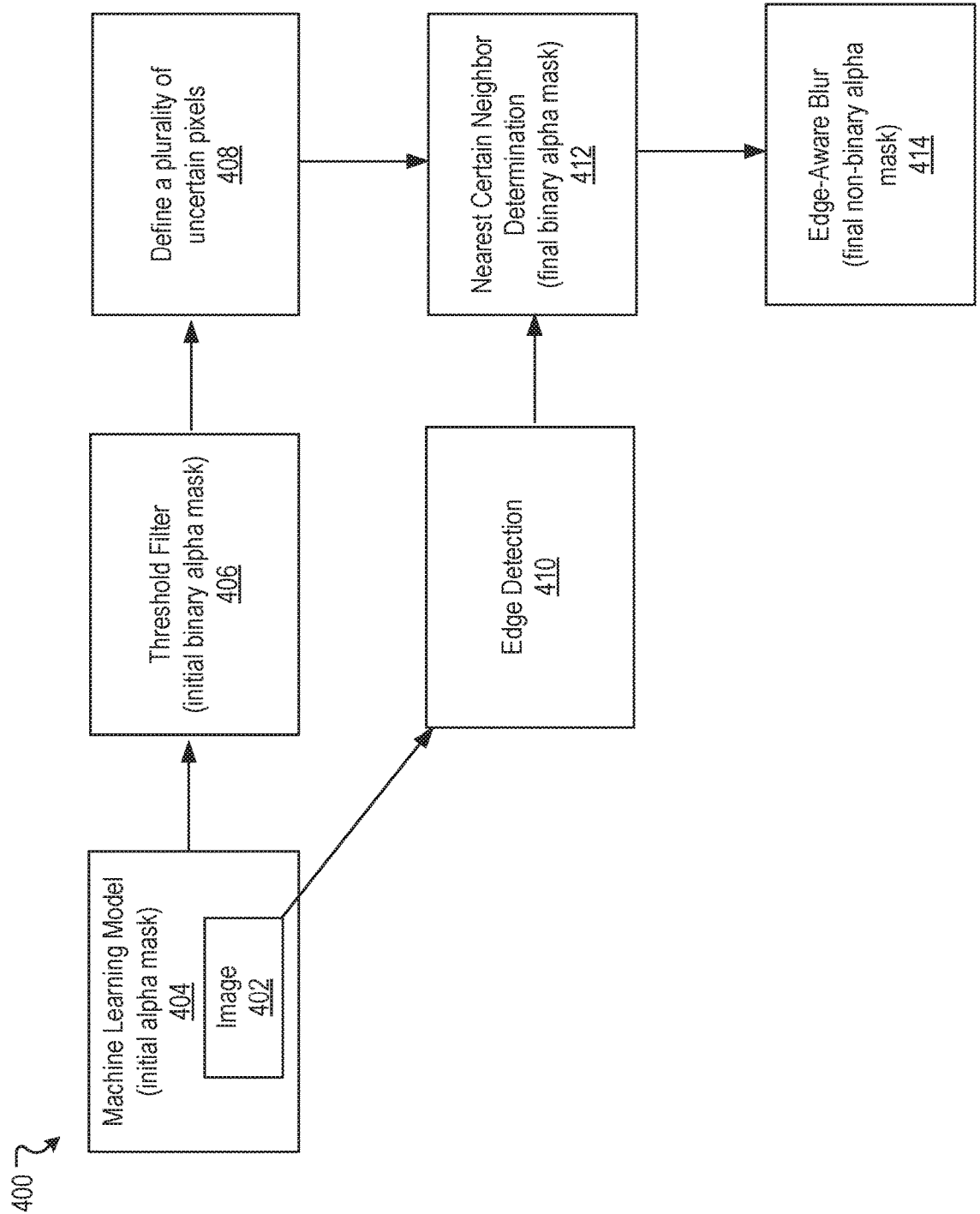
FIG. 4 illustrates an example functional block diagram associated with generating an alpha mask, according to an embodiment of the present disclosure.

FIG. 4 illustrates an example functional block diagram 400 associated with generating an alpha mask, according to an embodiment of the present disclosure. At block 404, an image 402 is provided to a machine learning model to generate an initial alpha mask. The initial alpha mask can comprise a plurality of non-binary alpha values. At block 406, a threshold filter is applied to the initial alpha mask to convert each non-binary alpha value into a binary alpha value, thereby generating an initial binary alpha mask. At block 408, a plurality of uncertain pixels are defined in the initial binary alpha mask. At block 410, edge detection is performed on the image 402 to detect one or more edges in the image 402. At block 412, a nearest certain neighbor determination is performed for each uncertain pixel of the plurality of uncertain pixels based on the edges detected in the image 402. For example, the nearest certain neighbor determination may be configured to assess penalties for crossing any detected edges. By performing the nearest certain neighbor determination for each uncertain pixel, each uncertain pixel is assigned a binary alpha value, and a final binary alpha mask is obtained. At block 414, an edge-aware blur is applied to the final binary alpha mask to obtain a final non-binary alpha mask. The edge-aware blur may be applied to generate a final alpha mask that has a more visually appealing effect, e.g., by gradually transitioning between background and foreground portions.

Figure 5A:
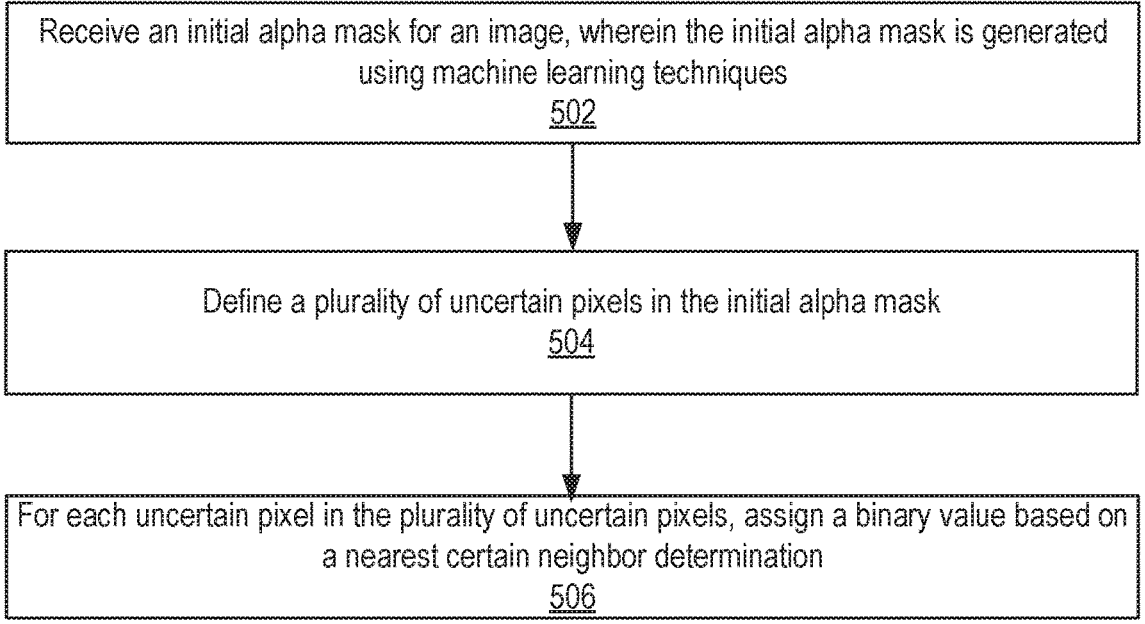
FIG. 5A illustrates an example method associated with generating an alpha mask, according to an embodiment of the present disclosure.

FIG. 5A illustrates an example method 500 associated with generating an alpha mask, according to an embodiment of the present disclosure. It should be appreciated that there can be additional, fewer, or alternative steps performed in similar or alternative orders, or in parallel, based on the various features and embodiments discussed herein unless otherwise stated.

At block 502, the example method 500 can receive an initial alpha mask for an image, wherein the initial alpha mask is generated using machine learning techniques. At block 504, the example method 500 can define a plurality of uncertain pixels in the initial alpha mask. At block 506, the example method 500 can, for each uncertain pixel in the plurality of uncertain pixels, assign a binary value based on a nearest certain neighbor determination. Other suitable techniques that incorporate various features and embodiments of the present technology are possible.

FIG. 5B illustrates an example method 550 associated with modifying an image based on an alpha mask, according to an embodiment of the present disclosure. It should be appreciated that there can be additional, fewer, or alternative steps performed in similar or alternative orders, or in parallel, based on the various features and embodiments discussed herein unless otherwise stated.

At block 552, the example method 550 can generate an initial alpha mask for an image based on machine learning techniques. At block 554, the example method 550 can apply a threshold filter to the initial alpha mask to obtain an initial binary alpha mask. At block 556, the example method 550 can define a plurality of uncertain pixels in the initial binary alpha mask. At block 558, the example method 550 can define one or more edges in the image based on automated edge detection techniques. At block 560, the example method 550 can, for each uncertain pixel in the plurality of uncertain pixels, assign a binary value based on a nearest certain neighbor determination to obtain a final binary alpha mask, wherein the nearest certain neighbor determination comprises assessing a penalty for crossing an edge. At block 562, the example method 550 can apply an edge-aware blur to the final binary alpha mask to obtain a final alpha mask. At block 564, the example method 550 can replace a background portion of the image based on the final alpha mask and a second image. Other suitable techniques that incorporate various features and embodiments of the present technology are possible.

It is contemplated that there can be many other uses, applications, features, possibilities, and variations associated with various embodiments of the present technology. For example, users can choose whether or not to opt-in to utilize the present technology. The present technology also can ensure that various privacy settings, preferences, and configurations are maintained and can prevent private information from being divulged. In another example, various embodiments of the present technology can learn, improve, and be refined over time.

Social Networking System—Example Implementation

Figure 6:
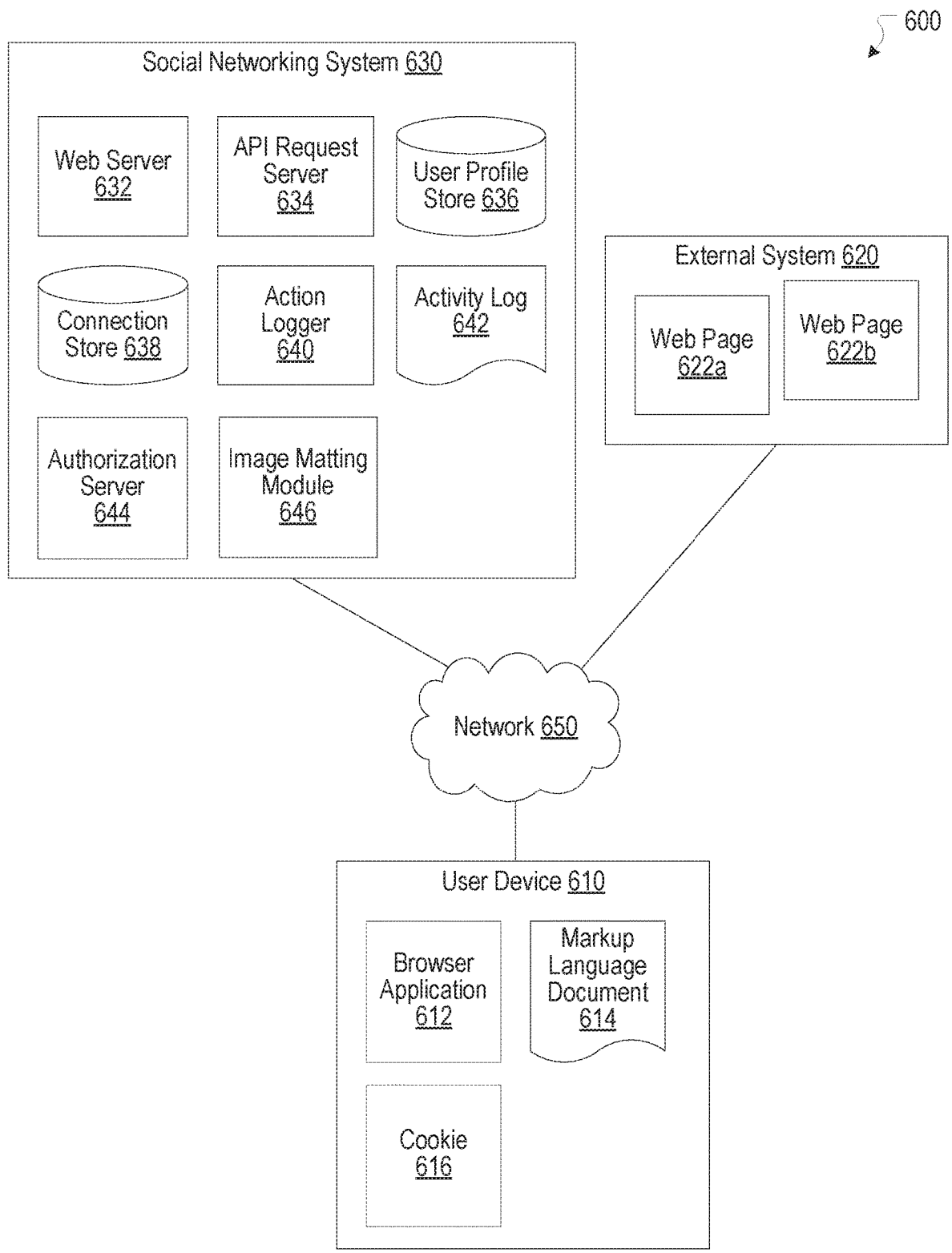
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include image matting module 646. The image matting module 646 can, for example, be implemented as the image matting module 102, as discussed in more detail herein. As discussed previously, it should be appreciated that there can be many variations or other possibilities. For example, in some embodiments, one or more functionalities of the image matting module 646 can be implemented in the user device 610.

Hardware Implementation

Figure 7:
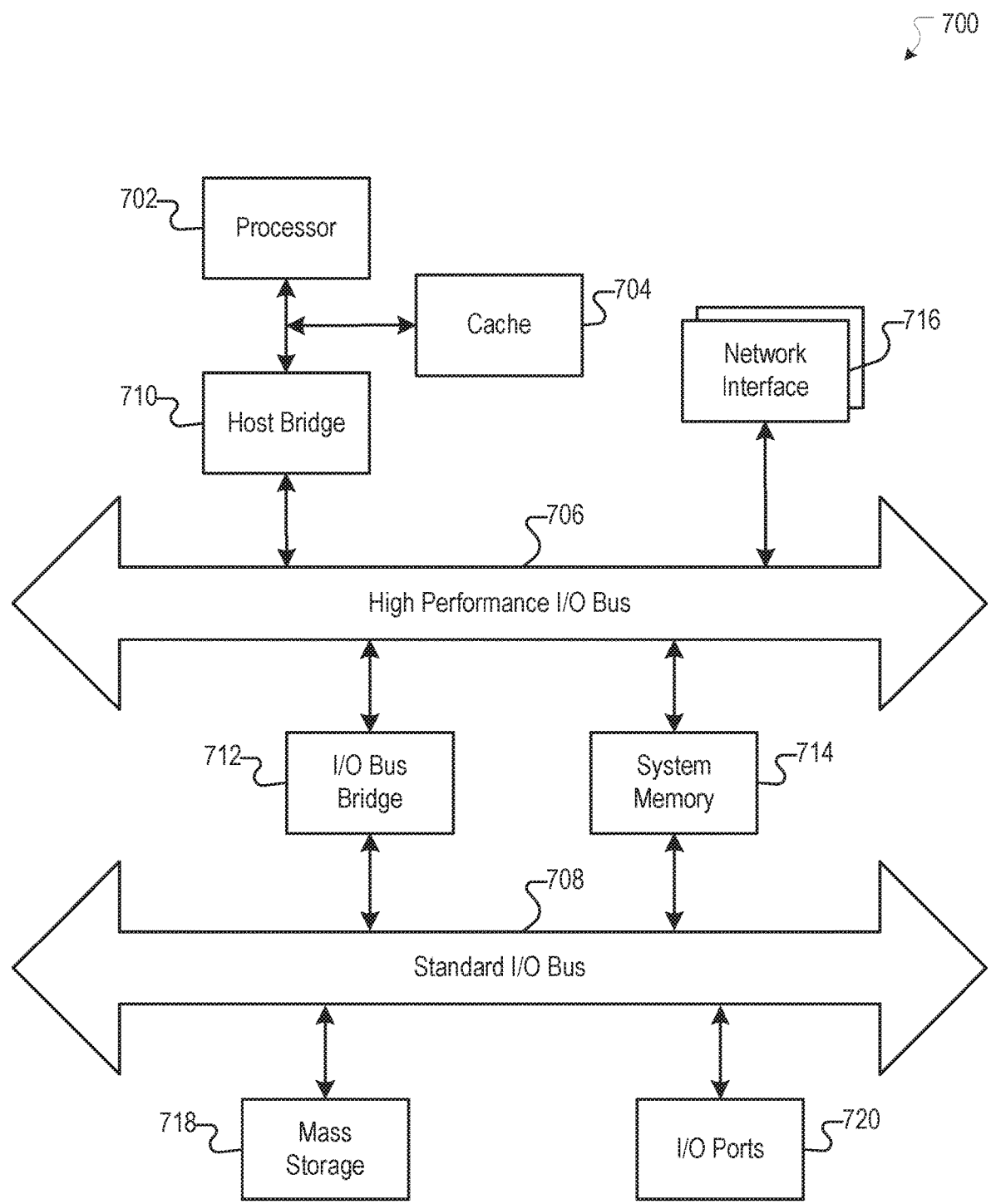
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   generating, by a computing system, an initial alpha mask for an image based on at least one machine learning technique;
   defining, by the computing system, a plurality of uncertain pixels in the initial alpha mask;
   performing, by the computing system, a nearest certain neighbor determination for at least one uncertain pixel in the plurality of uncertain pixels, wherein the performing comprises:
   identifying, by the computing system, a certain pixel not in the plurality of uncertain pixels; and
   determining, by the computing system, a distance from the uncertain pixel to the certain pixel; and
   assigning, by the computing system, for the uncertain pixel in the plurality of uncertain pixels, a binary value based on the distance.

2. The computer-implemented method of claim 1, further comprising identifying one or more edges in the image based on automated edge detection techniques.

3. The computer-implemented method of claim 2, wherein the nearest certain neighbor determination comprises assessing a penalty for crossing an edge of the one or more edges.

4. The computer-implemented method of claim 3, wherein the penalty is implemented using geodesic filtering.

5. The computer-implemented method of claim 2, wherein:
   the assigning, for at least one uncertain pixel in the plurality of uncertain pixels, a binary value comprises assigning, for each uncertain pixel in the plurality of uncertain pixels, a binary value based on a nearest certain neighbor determination to obtain a final binary alpha mask; and
   the method further comprises applying an edge-aware blur to the final binary alpha mask.

6. The computer-implemented method of claim 5, wherein the edge-aware blur is applied to the final binary alpha mask based on guided filtering techniques.

7. The computer-implemented method of claim 1, further comprising:
   applying a threshold filter to the initial alpha mask to obtain an initial binary alpha mask,
   wherein the defining the plurality of uncertain pixels in the initial alpha mask comprises defining the plurality of uncertain pixels in the initial binary alpha mask.

8. The computer-implemented method of claim 1, wherein defining the plurality of uncertain pixels comprises defining a pre-defined number of uncertain pixels.

9. The computer-implemented method of claim 8, wherein the pre-defined number of uncertain pixels is determined based on a size of the image.

10. The computer-implemented method of claim 1, further comprising generating a final alpha mask based on the assigning, for each uncertain pixel in the plurality of uncertain pixels, a binary value; and modifying the image based on the final alpha mask and a second image, wherein the generating the initial alpha mask comprises calculating an alpha value for each pixel in the initial alpha mask, wherein the alpha value is indicative of a likelihood that the pixel is associated with a background portion or a foreground portion, and the alpha value is calculated based on the second image.

11. A system comprising:

at least one processor; and a memory storing instructions that, when executed by the at least one processor, cause the system to perform a method comprising:

generating an initial alpha mask for an image based on at least one machine learning technique;

defining a plurality of uncertain pixels in the initial alpha mask;

performing a nearest certain neighbor determination for at least one uncertain pixel in the plurality of uncertain pixels, wherein the performing comprises:

identifying a certain pixel not in the plurality of uncertain pixels; and determining a distance from the uncertain pixel to the certain pixel; and assigning for the uncertain pixel in the plurality of uncertain pixels, a binary value based on the distance.

12. The system of claim 11, wherein the method further comprises:

identifying one or more edges in the image based on automated edge detection techniques.

13. The system of claim 12, wherein the nearest certain neighbor determination comprises assessing a penalty for crossing an edge of the one or more edges.

14. The system of claim 13, wherein the penalty is implemented using geodesic filtering.

15. The system of claim 12, wherein the assigning, for at least one uncertain pixel in the plurality of uncertain pixels, a binary value comprises assigning, for each uncertain pixel in the plurality of uncertain pixels, a binary value based on a nearest certain neighbor determination to obtain a final binary alpha mask; and the method further comprises applying an edge-aware blur to the final binary alpha mask.

16. A non-transitory computer-readable storage medium including instructions that, when executed by at least one processor of a computing system, cause the computing system to perform a method comprising:

generating an initial alpha mask for an image based on at least one machine learning technique;

defining a plurality of uncertain pixels in the initial alpha mask;

performing a nearest certain neighbor determination for at least one uncertain pixel in the plurality of uncertain pixels, wherein the performing comprises:

identifying a certain pixel not in the plurality of uncertain pixels; and determining a distance from the uncertain pixel to the certain pixel; and assigning for the uncertain pixel in the plurality of uncertain pixels, a binary value based on the distance.

17. The non-transitory computer-readable storage medium of claim 16, wherein the method further comprises:

identifying one or more edges in the image based on automated edge detection techniques.

18. The non-transitory computer-readable storage medium of claim 17, wherein the nearest certain neighbor determination comprises assessing a penalty for crossing an edge of the one or more edges.

19. The non-transitory computer-readable storage medium of claim 18, wherein the penalty is implemented using geodesic filtering.

20. The non-transitory computer-readable storage medium of claim 17, wherein the assigning, for at least one uncertain pixel in the plurality of uncertain pixels, a binary value comprises assigning, for each uncertain pixel in the plurality of uncertain pixels, a binary value based on a nearest certain neighbor determination to obtain a final binary alpha mask; and the method further comprises applying an edge-aware blur to the final binary alpha mask.

* * * * *